May 7, 1963 J. J. HORAN 3,089,027
MOUNTING FOR HEADLAMP
Filed Feb. 9, 1959 2 Sheets-Sheet 2

John J. Horan

United States Patent Office 3,089,027
Patented May 7, 1963

3,089,027
MOUNTING FOR HEADLAMP
John J. Horan, 420 Quigley Ave., Willow Grove, Pa.
Filed Feb. 9, 1959, Ser. No. 791,928
8 Claims. (Cl. 240—57)

This invention pertains to headlamps for vehicles.

For many years it has been customary to provide automobiles with headlamp means containing two filaments, one a high beam and the other a low beam. The word "high" has generally meant not only increased candlepower but also a slightly higher aiming zone.

In the past both filaments were generally placed in the same bulb; but the fact that no two filaments can occupy the same focal point has caused adoption of dual pairs of headlights, despite their greatly increased installation cost, in most new American-built automobiles.

Esthetically, the circular headlight lens seldom harmonizes with automotive styling trends. Twin pairs of round headlights are even less pleasing from the design point of view. From the cost standpoint the space and area consumed and the multiplicity of parts required for mounting and adjustment counterbalance the advantages of headlamp pair arrangements (even through the individual lamps have been made smaller).

In this application I seek to show how the overall vehicular headlighting problem may be mitigated by a wholly new approach to the problems of design, mounting and adjustment of headlamps.

Among the objects of this invention are: (1) to combine the two lamps in one esthetic assembly without penalizing filament orientation; (2) to reduce the cost of vehicular headlighting; (3) to improve the reflective efficiency of the lamps; (4) to lengthen the life of the filaments by conducting heat through a more efficient path; (5) to provide a novel, useful and distinctive filament support structure and method of assembly; (6) to provide for fixed and permanent relative orientation of high and low beams in the lamp itself; (7) to provide the lightest weight and most compact overall assembly; (8) to simplify initial installation and adjustment of headlamps; (9) to minimize the necessity for further adjustments during the life of the vehicle; (10) to provide a headlamp and mounting design which will be theft proof in many installations.

Further objects and accomplishments of this invention will become clear in the balance of the specification, the claims and the drawings in which:

Figure 1:
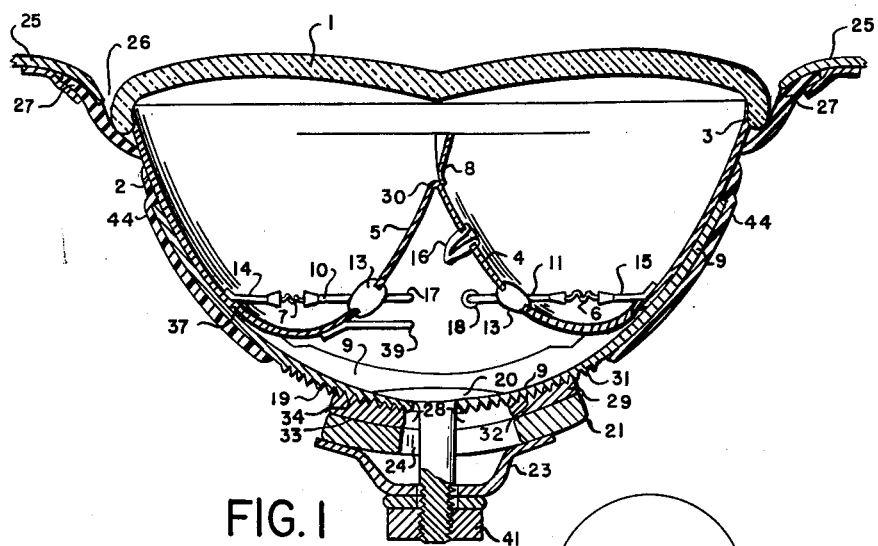
FIG. 1 is a sectional view of one form of twin headlamp in accordance with this invention.

Referring now to FIGS. 1, 2, 3, and 5, there is shown a twin headlamp lens 1, preferably molded with a light directing pattern (not shown). The lens 1 is preferably secured to a metallic body 2 with a feathered edge seal 3. The body 2 is divided into two essentially parabolic reflectors 4, 5. The axes of these two paraboloids 4, 5 are not necessarily exactly parallel to each other; and the generally parabolic contour of one or the other may be modified in one or more planes. Although the paraboloids might have been completely separated, their axis-to-axis distance has been shown foreshortened slightly so that their walls intersect along the margin 30. A small optional fence 8 has been installed atop the margin. This fence 8 may be either straight or, as shown, may favor one of the paraboloids, generally the "bright" or "country" beam.

The filament electrode design may be conventional; or the short stubby electrodes shown in my copending application No. 791,907, now Patent Number 3,020,437, issued February 6, 1962, for "Elastic Lamps" may be used. However I prefer, in this instance, to apply a new inventive technique.

Figure 5:
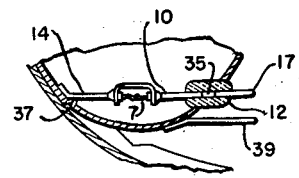
FIG. 5 is a fragmentary view of one of the filament assemblies of FIG. 1 during an early stage of lamp assembly.

It should be remembered that it is not necessarily the size of the headlamp that counts, but rather its light directing efficiency. This characteristic is in part a function of the accuracy of its construction. Glass technology being generally limited as to accuracy in production, the use of a metallic reflector affords better control of the focal point of the paraboloid and of the placement of the filament with respect to the focal point. Still further improvement of control of filament placement can be achieved with the filament support structure to be described. Referring first to the structure in the left hand paraboloid 5, it will be seen that the filament 7 lies between the ground electrode 14 and the live electrode 10. The tubular ground electrode 14 carries one terminal of the filament tacked in place between its pinched sides. Referring momentarily to FIG. 5, the temporary bridge has been bonded temporarily by solder or other suitable means at either end, respectviely, to the ground electrode 14 and the live electrode 10, providing structural continuity in the dual electrode-filament assembly during lamp fabrication. The tubular live electrode 10 receives the second terminal of the filament 7 between its pinched sides. The live electrode 10 is treated so that only the small area 35 will have an affinity for glass. One way is to mask the electrode during a prior electroplating treatment. The live electrode 10 carries a short length of centerless-ground glass tubing 12 which fits the hole pierced in paraboloid 5, through which the filament and support assembly has been admitted. Upon the application of local heat, surface tension will contract the glass axially and expand it diametrically, simultaneously effecting a seal to the live electrode 10 at area 35 and to the wall 5. The final bead shape will resemble that shown at 13 in FIG. 1 in both paraboloids. The bridge 36 may then be sheared off or, preferably, removed with a hot iron, leaving a structure similar to that shown in FIG. 1. Filament support assemblies may be oriented in any direction perpendicular to the axes of their paraboloids; and even perpendicularity is not a requisite. Vapor plating of the reflector might follow assembly of the filament structure. It may be desirable to employ a stop-off compound or device to prevent vapor plating from impinging on certain areas.

Either tubular live electrode 10 or 11 may be used for evacuation and sealing; or both may be plugged and a tip-off tube 16 located at any desired point. Individual electrical connections may be made directly to the extended live electrodes, which may be bent at right angles and size coded 17, 18; or a plastic plug may be molded directly upon them and upon the optional ground return electrode 29. When a single electrode structure carries a second filament so oriented with respect to the focal point and the lens as to throw a "flood" beam, a two holed bead can be employed as a common insulator for both live electrodes.

The straight-line internal arrangement of the electrodes permits maximum automation of production operations, reduces the shadow area of light ray interception by electrodes to the minimum, and provides a maximum accuracy of filament location with respect to the focus of the paraboloid. This permits reducing the focal distance with minimum probability of introducing inaccuracy. When this distance can be thus reduced, the design of the paraboloid itself changes and its curvature increases, thus permitting each paraboloid to be shallower and smaller, and to have a smaller frontal opening than permitted heretofore for production lamps. This size reduction is in addition to the obvious one that results from combining two lamps in one envelope.

Since the paraboloids bear a factory-fixed orientation with respect to each other they may be mounted and aimed by means of the single, simple device next described. The two ends of the lamp bracket 9, which have been spotwelded to the paraboloids in an early assembly operation, have been contoured to mate with, strengthen, and rigidize the body 2 so as to permit use of the lightest practical gage of metal in the paraboloids and thereby minimize the stress in the glass at seal 3, as well as the problem of drawing the body 2, especially if it is made from a single piece of sheet metal. Other body constructions and methods of manufacture are also possible.

Figure 2:
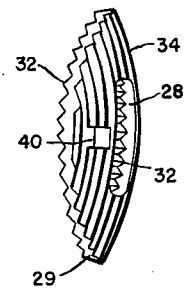
FIG. 2 is a view of the adjustment adapter turned to show maximum detail.

The mid portion of the lamp bracket 9 has a spherical contour, the serrations 31 being meridians, generally perpendicular to the plane of the paper. The adapter 29, shown also in FIG. 2, is a spherical segment having matching meridian serrations 32 on its interior face and a slot 28 which affords clearance for the stud 20 during adjustment of the position of the adapter 29 with respect to the lamp bracket 9. The stud 20 has a broad head which is welded to the lamp bracket 9. In order to provide adjustment in a perpendicular direction, the adapter has meridian serrations 34 on its exterior surface generally perpendicular to those 32 on its interior surface. These exterior serrations 34 match with corresponding serrations 33 on the interior surface of a carrier bracket 21, which is a part of the automobile. The carrier bracket 21 has a circular clearance hole 24 to permit relative movement of the stud 20. Shallow projections 40 on the adapter 29 slide in a groove (not shown) in the carrier bracket 21 and prevent relative misalignment during adjustment. The lamp plate 23 provides the necessary resilience and bearing area to permit secure and permanent alignment of the headlamp in any position within the range of adjustment when the nut 41 is tightened.

Installation of the lamp becomes an operation of utmost simplicity, since only one nut needs to be assembled. Adjustment likewise becomes simple because the nut needs only to be backed off a turn or two for either lateral or vertical adjustment.

The adapter 29 may be eliminated if the serrations are very fine or if the mating surfaces instead are knurled or roughened in a fine pattern; or an abrasive or similar coating may be applied on either the lamp bracket 9 or the carrier bracket 21, particularly if the mating surface is soft.

Figure 6:
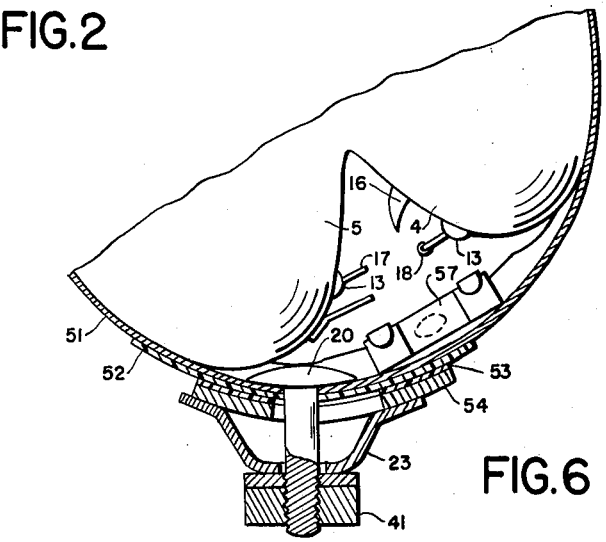
FIG. 6 is a fragmentary view of an alternative adjustment portion applicable to the lamps of this invention.

FIG. 6 is an example in which is shown an alternative clamping and adjustment portion, with the adapter 29 now eliminated. The lamp bracket 51, which may otherwise be similar in construction to lamp bracket 9 of FIG. 1, lamp bracket 103 of FIG. 4, or lamp bracket 115 of FIG. 8, differs from these others in that the meridianal serrations have been replaced by friction-treated surface 52. Likewise, and primarily for illustration, the carrier bracket 31 has been replaced by friction-treated surface 53. Friction-treated surfaces 52, 53 may include fine-milled serrations or knurls, organic coatings, soft metals, brake-lining type material coatings, etc., and combinations. The larger the area of the segments, and the tighter the available stud gripping force, the less is the need for special treatment of either or both of the mating surfaces.

Since all suspension and aiming is done from a spherical reference, the center of the sphere being near the front face of the lamp, and since the confinement of the lamp face, formerly required, is now eliminated, aiming adjustment has little effect upon the clearance between the lens and the sheet metal skin 25 of the automobile. A simple peripheral gasket 27 will suffice to keep dust and dirt out of the interior access spaces. Conventional coatings 44 may be applied to exterior surfaces to damp out high frequency vibration. This lamp will be theft and tamper-proof whenever the hood is locked from inside the vehicle.

Figure 3:
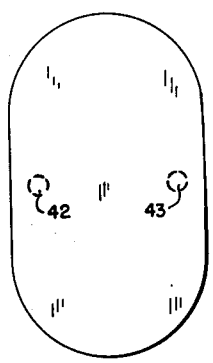
FIG. 3 is a reduced scale frontal view of the headlamp of FIG. 1.
Figure 7:
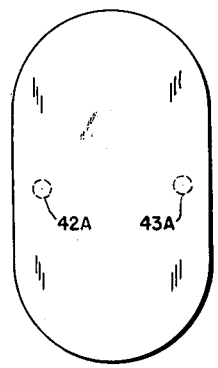
FIG. 7 is a second reduced-scale frontal view applicable to the lamp of FIG. 1.

In the areas 42, 43 shown in FIG. 3, it is quite possible to locate parking or directional lamp filaments. Alternatively, in FIG. 7, glass bead inserts in the metal body under areas 42A, 43A would permit small lamps, mounted behind the headlamp, to shine through.

Figure 4:
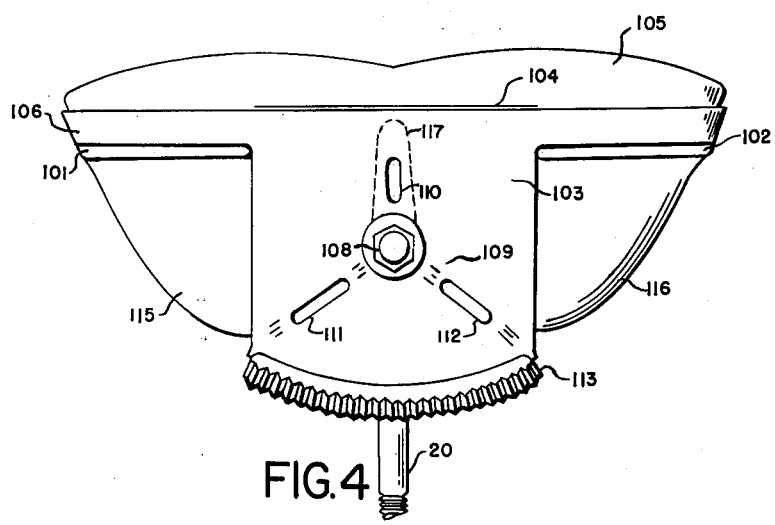
FIG. 4 is a side view of a second embodiment of this invention.
Figure 8:
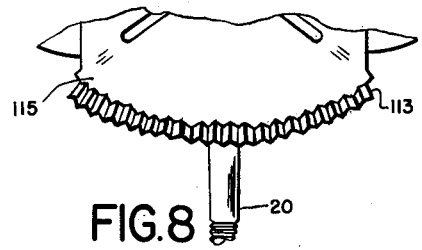
FIG. 8 is a fragmentary view of an alternative spherical adjusting segment portion applicable to the embodiment shown in FIG. 4.

Referring now to FIGS. 4 and 8, there are shown alternate forms of this invention, the lamp having a glass body bearing partial peripheral ridges 101, 102 on the tapered portion behind the lens 105. These ridges serve as a retainer for the band 106 of the lamp bracket 103. The line 104 marks the departure of the reentrant portions of the external surfaces of the two paraboloids 115, 116 from the profile of the lens 105. Therefore, the band portion 106 of the lamp bracket 103, if indented in this area, cannot move forward beyond this line 104.

Installation of the lamp bracket 103 is from the rear of the lamp, there being just sufficient slack in the band portion 106 to enable it to be slipped over the ridges 101, 102 which may be deeper toward their tips. The fastener 108, which may be a screw and nut, as shown, and which may exert preferential force through an optional arm 117 (dotted), is then tightened, causing the connecting portion 109 of the lamp bracket to be buckled inwardly (or downwardly as the drawing is viewed). The opposite connecting portion (not shown) is likewise buckled inwardly (or upwardly). Slots 110, 111, and 112, being weak areas, serve to direct the lines of buckling along their axes. The slight slack in the band portion 106 is thus taken up by inward deflection of the band 106, permitting the ridges 101, 102 to serve as retainers for the band portion 106. The spherical adjusting segment 113 may be an integral part of the lamp bracket 115, as shown in FIG. 8, or, as shown in FIG. 4, the lamp bracket 103 may have a separate piece bridging the distance between the upper and lower connecting portions, to the ends of which it has been spotwelded. The stud 20 performs the same function as in the previous embodiment. Other details common to the previous embodiment or contained in the prior art have been omitted.

It will be obvious that the filament support structure and sealing means, and the headlamp construction and adjustment means as well, are equally applicable to single-filament lamps. It will be obvious also that various changes and substitutions may be made without departing from the spirit of my invention. It is specifically requested that all the various inventive and cooperative means herein shown be granted patent protection; and it is intended that claims be drawn of sufficient included scope to forbid infringement in part as well as in toto.

I claim:
1. An aimable electric headlamp for vehicles comprising:
    a radiant energy producing device;
    a hermetically sealed enclosure for said device,
    said enclosure having a front and a rear,
    said enclosure including a radiant energy transmitting lens portion at said front,
    said rear having a reflective cavity surface within said enclosure,
    said cavity surface being aligned with respect to said radiant energy producing device for orienting ra- diant energy produced by said device and incident upon said surface by reflection therefrom frontwards of said head lamp via said lens portion; bracket means attached to said rear, said bracket means projecting from said headlamp and including a spherical segment, said spherical segment constituting a portion of the boundary of a spherical zone, said zone having a diameter perpendicular to said spherical segment, said diameter being directed toward said front of said hermetically sealed enclosure, so that said spherical segment presents a concave surface toward said front, said segment being adapted to be seated against a mating extraneous spherical mounting segment and to be clamped in angular adjustment thereto, said enclosure being closed by a gas-impervious fused-glass sealing means.

2. An electric lamp as in claim 1, comprising a plurality of individual sets of said radiant energy producing devices, lens portions, and reflective cavity portions adjacently arrayed.

3. An electric lamp as in claim 1, said reflective cavity portion having been fabricated of metal, said bracket means having been affixed thereto by a bonding process.

4. An electric lamp as in claim 1, said reflective cavity portions having been fabricated of metal, said bracket means having been affixed to at least one of said reflective cavity portions by a bonding process.

5. An electric lamp as in claim 1, said spherical segment having a serrated surface adapted to be clamped to a mating, generally spherical, extraneous surface.

6. An electric lamp as in claim 1, said spherical segment having a surface treated to increase the coefficient of sliding friction thereof.

7. An electric lamp as in claim 1, said clamping means including a fastener generally centrally located relative to said segment.

8. An electric lamp comprising: at least one radiant energy producing device; a hermetically sealed enclosure for said device, said enclosure including a radiant energy transmitting portion and a reflective cavity portion, said reflective cavity portion being aligned with respect to said radiant energy producing device to focus radiant energy incident thereon generally forward via said lens; supporting bracket means attached to said enclosure and including a spherical segment, said spherical segment constituting part of a zone of sphericity, said zone having a diameter perpendicular to said segment and intersecting said reflective cavity portion; an intermediate spherical segment; keying means permitting said intermediate spherical segment to be rotated adjustably in one plane relative to said first mentioned segment; keying means permitting said intermediate segment to be rotated in a plane generally perpendicular to said first mentioned plane relative to an extraneous spherical segment comprising part of a vehicle; and clamping means adapted to bind all three segments against relative motion.

References Cited in the file of this patent

UNITED STATES PATENTS

| | | |
|---|---|---|
| 1,509,068 | Herron | Sept. 16, 1924 |
| 1,562,875 | Dubben et al. | Nov. 24, 1925 |
| 1,635,116 | Du Brevil | July 5, 1927 |
| 1,795,899 | Seaholm | Mar. 10, 1931 |
| 1,804,049 | Claus | May 5, 1931 |
| 1,871,205 | Werner | Aug. 9, 1932 |
| 2,114,350 | Lee | Apr. 19, 1938 |
| 2,115,982 | Worden | May 3, 1938 |
| 2,293,529 | Bedford | Aug. 18, 1942 |
| 2,405,261 | Levi et al. | Aug. 6, 1946 |
| 2,489,261 | Braunsdorff | Nov. 29, 1949 |
| 2,781,654 | Pipkin | Feb. 19, 1957 |
| 2,791,713 | Dean | May 7, 1957 |
| 2,791,714 | Beesley | May 7, 1957 |
| 2,794,699 | Eber | June 7, 1957 |
| 2,800,578 | Falge | July 23, 1957 |
| 2,814,722 | Dredring | Nov. 26, 1957 |